(12) United States Patent
Hou et al.

(10) Patent No.: US 11,302,272 B2
(45) Date of Patent: Apr. 12, 2022

(54) DISPLAY DEVICE, AND DRIVING METHOD FOR THE DISPLAY DEVICE FOR REDUCING POWER CONSUMPTION AND IMPROVING DISPLAY EFFECT

(71) Applicant: BOE TECHNOLOGY GROUP CO., LTD., Beijing (CN)

(72) Inventors: Mengjun Hou, Beijing (CN); Yidan Peng, Beijing (CN); Jijing Huang, Beijing (CN); Zongmin Liu, Beijing (CN); Liye Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 16/826,254

(22) Filed: Mar. 22, 2020

(65) Prior Publication Data
US 2021/0166644 A1 Jun. 3, 2021

(30) Foreign Application Priority Data
Nov. 28, 2019 (CN) .......................... 201911193096.7

(51) Int. Cl.
G09G 3/36 (2006.01)
G02F 1/13357 (2006.01)
G02F 1/1362 (2006.01)

(52) U.S. Cl.
CPC ..... *G09G 3/3607* (2013.01); *G02F 1/133602* (2013.01); *G02F 1/136286* (2013.01); *G09G 3/3688* (2013.01); *G02F 2201/52* (2013.01)

(58) Field of Classification Search
CPC ..... G09G 2310/0237; G09G 2310/024; G09G 3/06–19; G09G 3/22–28;
(Continued)

(56) References Cited

U.S. PATENT DOCUMENTS

2007/0057903 A1 3/2007 Tsumura et al.
2010/0127959 A1 5/2010 Su et al.
(Continued)

FOREIGN PATENT DOCUMENTS

CN 101078844 A 11/2007
CN 107229157 10/2017
(Continued)

OTHER PUBLICATIONS

First Office Action for CN Patent Application No. 201911193096.7 dated Sep. 29, 2020.

*Primary Examiner* — Sanghyuk Park
(74) *Attorney, Agent, or Firm* — Thomas | Horstemeyer, LLP

(57) ABSTRACT

The present disclosure provides a display device and a driving method. The display device includes a display panel and a backlight module, where the display panel includes a plurality of display regions, the backlight module includes x light sources, each of the plurality of display regions corresponds to one of the light sources, each of the light sources includes a plurality of light emitting units which emit light of different colors, and x is a positive integer not smaller than 2. The driving method includes, after loading data signals to subpixels in one of the display regions, turning on a light emitting unit corresponding to the one of the display regions and at the same time, loading datap signals to subpixels in a next one of the display regions which is adjacent to the one of the display regions.

12 Claims, 3 Drawing Sheets

(58) Field of Classification Search
CPC ......... G09G 3/294–2948; G09G 3/299; G09G 3/30–3493
See application file for complete search history.

(56) References Cited

U.S. PATENT DOCUMENTS

| | | | | |
|---|---|---|---|---|
| 2010/0165013 | A1* | 7/2010 | Yamamoto | H04N 9/3117 345/692 |
| 2011/0242100 | A1* | 10/2011 | Yamazaki | G09G 3/3677 345/419 |
| 2012/0001955 | A1* | 1/2012 | Yamazaki | G09G 3/3688 345/690 |
| 2015/0187254 | A1* | 7/2015 | Lee | G09G 3/2022 345/76 |

FOREIGN PATENT DOCUMENTS

| | | |
|---|---|---|
| CN | 108206016 A | 6/2018 |
| CN | 109243386 A | 1/2019 |
| CN | 110459187 A | 11/2019 |
| WO | 2007055454 A1 | 5/2007 |

* cited by examiner after loading data signals to subpixels in one of the display regions, turning on a light emitting unit corresponding to the one of the display regions and at the same time loading data signals to subpixels in a next one of the display regions which is adjacent to the one of the display regions — S110

DISPLAY DEVICE, AND DRIVING METHOD FOR THE DISPLAY DEVICE FOR REDUCING POWER CONSUMPTION AND IMPROVING DISPLAY EFFECT

CROSS-REFERENCE TO RELATED APPLICATION

This application claims the benefit of and priority to Chinese Patent Application No. 201911193096.7 filed Nov. 28, 2019, the contents of which being incorporated by reference in their entirety herein.

TECHNICAL FIELD

The present disclosure relates to display technologies and, in particular, to a display device and a driving method for the display device.

BACKGROUND

A liquid crystal display device generally includes a liquid crystal display panel and a backlight module. The backlight module provides light required by the liquid crystal display panel in order to display images. Color mixing performed in liquid crystal display devices can be divided into two types: temporal color mixing and spatial color mixing. Liquid crystal displays using a field sequential color method to achieve the temporal color mixing have been widely used, especially in transparent display devices. However, existing liquid crystal display devices using the field sequential color method have large power consumption, and the display effect needs to be improved.

It should be noted that the information disclosed in the Background section above is only for enhancing the understanding of the background of the present disclosure and thus, may include information that does not constitute prior art known to those of ordinary skill in the art.

SUMMARY

According to a first aspect of embodiments of the present disclosure, there is provided a driving method for a display device, where the display device includes a display panel and a backlight module, the display panel includes a plurality of display regions, the backlight module includes x light sources, each of the plurality of display regions corresponds to one of the light sources, and each of the light sources includes a plurality of light emitting units which emit light of different colors, and x is a positive integer not smaller than 2;

the driving method includes:

after loading data signals to subpixels in one of the display regions, turning on a light emitting unit corresponding to the one of the display regions and at the same time loading data signals to subpixels in a next one of the display regions which is adjacent to the one of the display regions.

According to a second aspect of embodiments of the present disclosure, there is provided a display device, including:

a display panel including a plurality of display regions;

a backlight module including x light sources, wherein each of the plurality of display regions corresponds to one of the light sources, and each of the light sources includes a plurality of light emitting units which emit light of different colors, and x is a positive integer not smaller than 2;

a driving circuit; and a control circuit configured to, after the driving circuit loads data signals to subpixels in one of the display regions, turn on a light emitting unit corresponding to the one of the display regions and at the same time control the driving circuit to load data signals to subpixels in a next one of the display regions which is adjacent to the one of the display regions.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is understood that the drawings in the following description show only some of the embodiments of the present disclosure, and other drawings may be obtained by those skilled in the art without departing from the drawings described herein.

DETAILED DESCRIPTION

Figure 1:
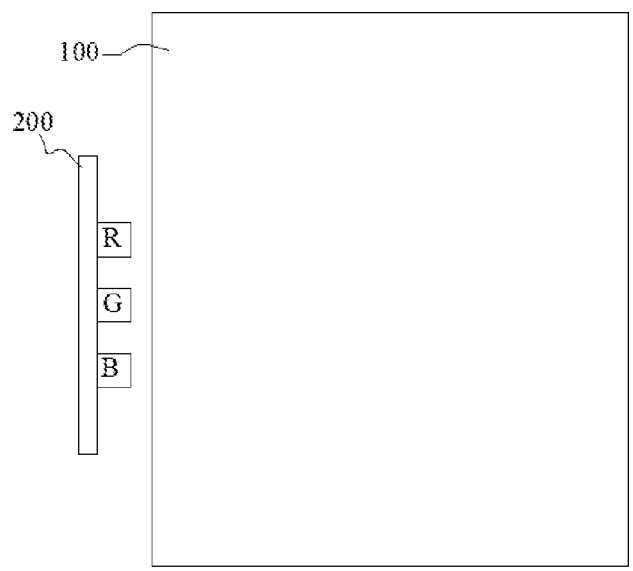
FIG. 1 is a schematic diagram of a display device in the related art.

Example embodiments will now be described more fully with reference to the accompanying drawings. However, the embodiments can be implemented in a variety of forms and should not be construed as being limited to the examples set forth herein. Rather, these embodiments are provided so that this disclosure will be more complete so as to convey the idea of the exemplary embodiments to those skilled in this art. The same reference numerals in the drawings denote the same or similar parts, and the detailed description thereof will be omitted. In addition, the drawings are merely schematic representations of the present disclosure and are not necessarily drawn to scale.

The terms "one", "a", "the", and "said" are used to indicate that there are one or more elements, components. or the like. The terms "include", "contain", and "have" are used to indicate an open type meaning of including and means that there may be additional element, components, etc. in addition to the listed elements, components, etc. The terms "first", "second", and "third" etc. are used only as markers, and do not limit the number of objects.

In the related art, as shown in FIG. 1, a liquid crystal display device which adopts the color sequential method includes a display panel 100 and a backlight module 200 on one side of the display panel 100. The display panel 100 includes a plurality of sub-pixels. The backlight module 200 includes a light source, where the light source includes light emitting elements which emit light of different colors, that is, a red light emitting element R, a green light emitting element G, and a blue light emitting element B.

Figure 2:
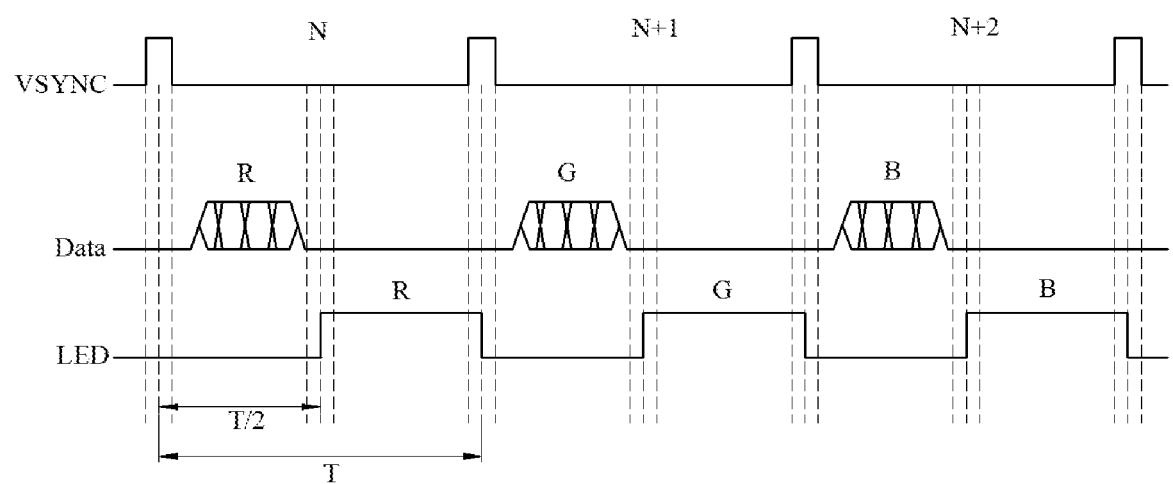
FIG. 2 is a timing diagram of a display device in the related art.

In FIG. 2, VSYNC is a vertical synchronization signal, and the duration of one frame is T. Data signal is a driving signal loaded to the sub-pixels to charge pixel electrodes of the sub-pixels, thereby controlling the deflection of the liquid crystal in the liquid crystal layer corresponding to the sub-pixels, adjusting the degree of light transmission of the liquid crystal layer, and controlling the gray scale of the light emission of the sub-pixels. LED signal is a signal to control each light-emitting element to turn on or off.

In the N-th frame, from the starting time to the time T/2, each sub-pixel is loaded with the signals Data for displaying the red color and, at this time, each light-emitting element is turned off, and the signal LED is at a low level. From the time T/2 to the end time of the N-th frame, the loading of the signals Data to the sub-pixels is finished. At this time, the R light-emitting element can be turned on, so that the sub-pixels display the red color. In the N-th frame, the duration of the loading of the signals Data to the sub-pixels and the duration of the turning on of the R light-emitting element are both T/2.

In the (N+1)-th frame, from the starting time to the time T/2, each sub-pixel is loaded with signals Data for displaying the green color and, at this time, each light-emitting element is turned off, and the signal LED is at a low level. From the time T/2 to the end time of the (N+1)-th frame, the loading of the signals Data to the sub-pixels is finished. At this time, the G light-emitting element can be turned on, so that the sub-pixels display the green color. In the (N+1)-th frame, the duration of the loading of the signals Data to the sub-pixels and the duration of the turning on of the G light-emitting element are both T/2.

In the (N+2)-th frame, from the starting time to the time T/2, each sub-pixel is loaded with signals Data for displaying the blue color and, at this time, each light-emitting element is turned off, and the signal LED is at a low level. From the time T/2 to the end time of the (N+2)-th frame, the loading of the signals Data to the sub-pixels is finished. At this time, the B light-emitting element can be turned on, so that the sub-pixels display the blur color. In the (N+2)-th frame, the duration of the loading of the signals Data to the sub-pixels and the duration of the turning on of the B light-emitting element are both T/2.

In the above-described process, the gray scale for the light emission of each of the sub-pixels can be controlled by controlling the magnitude of the data signal (i.e., voltage) loaded to the sub-pixel. Colorful display of the subpixels can be achieved by the above N-th to (N+2)-the frame. In each frame, the duration of loading the signals to the sub-pixels and the duration of the light emission of each light-emitting element are both a half of the duration of one frame, which is T/2. The duration of loading the signals to the sub-pixels is relatively short and thus, the refresh frequency of the data signals is relatively high.

Figures 3, 4:
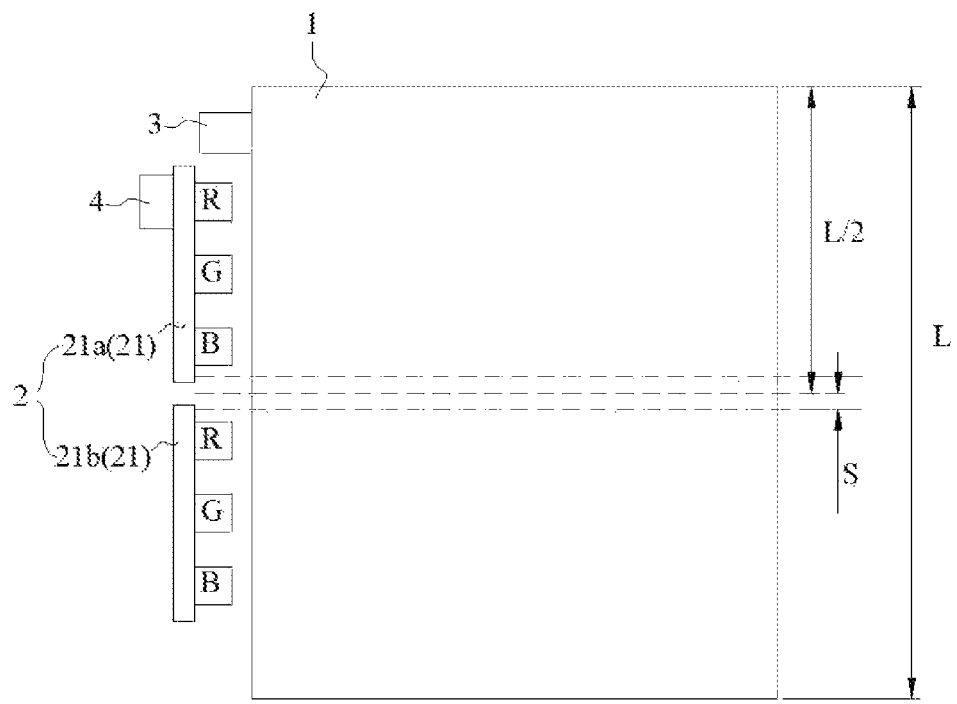
FIG. 3 is a schematic diagram of a display device according to an embodiment of the present disclosure.
FIG. 4 is a flowchart of a driving method according to an embodiment of the present disclosure.

An embodiment of the present disclosure provides a driving method for a display device. As shown in FIG. 3, the display device may include a display panel 1 and a backlight module 2. The display panel 1 includes a plurality of display regions. For example, as shown in FIG. 3, the display panel 1 includes two display regions, i.e. the upper half display region and the lower half display region. In other embodiments, there may be more display regions, and embodiments of the present disclosure do not impose specific limitations on the number of the display regions. Each sub-pixel in the display panel includes a pixel electrode, a common electrode, and a liquid crystal layer controlled by the pixel electrode and the common electrode. The length of the display panel in the vertical direction is L.

The backlight module 2 includes x light sources 21, where x is a positive integer not smaller than 2. In the example shown in FIG. 3, x is equal to 2, that the backlight module includes two light sources: the light source 21a and the light source 21b. Each display region corresponds to one light source. Light sources 21 are disposed on the same side or opposite two sides of the display panel 1 and are sequentially arranged along a length direction of a corresponding side of the display panel 1. Each light source 21 includes light emitting units which emit light of different colors. For example, each light source 21 may include light emitting units which emit light of red, green, and blue, respectively. The light source 21a and the light source 21b may be two three-color LED strips which have the same length and arranged at the upper and lower halves of the display panel.

As shown in FIG. 4, the driving method according to an embodiment of the present disclosure includes step S110.

In step S110, after data signals are loaded to subpixels in one of the display regions, a light emitting unit corresponding to the one of the display regions is turned on and, at the same, time data signals are loaded to subpixels in a next one of the display regions which is adjacent to the one of the display regions.

In the driving method of the embodiment of the present disclosure, the display panel is divided into a plurality of display regions, each of which corresponds to one light source. After data signals are loaded to subpixels in one of the display regions, a light emitting unit corresponding to the one of the display regions is turned on and, at the same time, data signals are loaded to subpixels in a next one of the display regions which is adjacent to the one of the display regions. That is, the turning on of the light source corresponding to a display region and the loading of data signals to a next adjacent display region are performed concurrently and thus, the refresh frequency of the data signals can be reduced. Also, the charging time of the subpixels is lengthened. Because the refresh frequency of the data signals is reduced, the power consumption of the display panel can be reduced. Further, because the charging time of the subpixels is lengthened, liquid crystals can respond more sufficiently and thus, the display effect can be improved.

According to an embodiment, the method in FIG. 4 may further include: turning on a light emitting unit corresponding to the next one of the display regions which is adjacent to the one of the display regions after a time period $2t$ after turning off the light emitting unit corresponding to the one of the display regions, where a color of light emitted by the light emitting unit corresponding to the one of the display regions and a color of light emitted by the light emitting unit corresponding to the next one of the display regions, which is adjacent to the one of the display regions, are different, where $0<t<T$, and T is a duration of one frame.

The time period between the turning off of the light emitting unit corresponding to one display region and the turning on of the light emitting unit corresponding to a next adjacent display region is $2t$, which can ensure that the light emitting units do not affect display effect of other display regions.

The display device of the embodiment of the present disclosure may be a transparent display device, which may have a first surface and a second surface opposite to each other. The backlight module 2 is a side-incident type structure and may be disposed between the first surface and the second surface. The sub-pixels are transparent structures and are distributed between the first surface and the second surface. When the light source 21 does not emit light, or the liquid crystal layer of the sub-pixels is in a state where the light emitted by the light source 21 cannot be emitted from the first surface and the second surface, the display device may be in a transparent state. When the light emitted from the light source 21 can be emitted from the first surface and the second surface, the display device can display images.

In embodiments of the present disclosure, the duration of each frame is the duration for each frame to display images, and embodiments of the present disclosure do not impose specific limitations on the duration T of each frame.

The sub-pixels of the display panel may be scanned line by line in order to load the data signals to the sub-pixels. The data signals may be a data signal applied to the pixel electrodes of the sub-pixels. The row direction of the progressive scanning may be the vertical direction or the horizontal direction of the display panel in FIG. 3 so long as the data signals can be loaded to the sub-pixels. By loading data signals to the subpixels, the deflection state of the liquid crystal of the liquid crystal layer corresponding to each sub-pixel is adjusted, so as to adjust the gray scale of the light transmitted through the sub-pixel, that is, control the gray scale for the light emission of the sub-pixel. The magnitudes of the data signals loaded on different sub-pixels can be different or same.

A color state of the sub-pixel is a liquid crystal deflection state that a sub-pixel should have when transmitting light of one color, which does not mean that the sub-pixel itself can emit light. Specifically, according to a frame of image to be displayed, the color mixing order (that is, the order of the monochromatic light that should be transmitted) and the gray scale for each sub-pixel when transmitting each monochromatic light are determined so as to determine the color state which each sub-pixel should have and accordingly to determine the required data signals.

Figure 5:
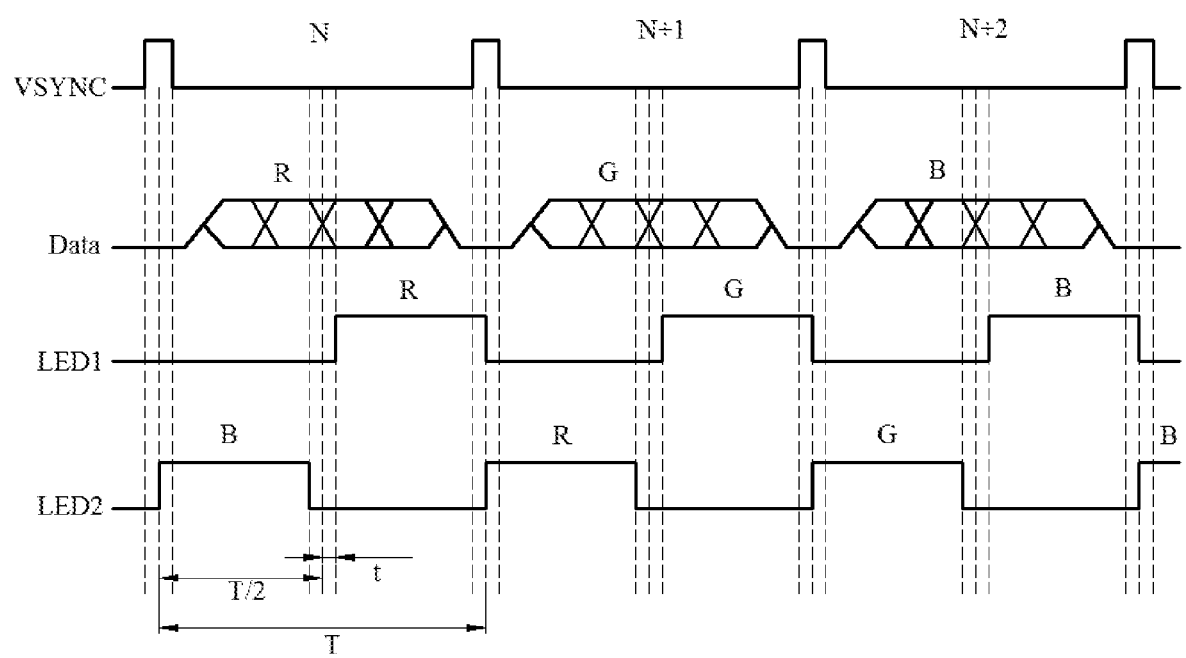
FIG. 5 is a timing diagram of a driving method according to an embodiment of the present disclosure.

FIG. 5 is schematic diagram showing time sequences of signals. The driving procedure will be described below with reference to FIG. 3 and FIG. 5.

In the embodiment, the number of the light sources 21 is two, including the first light source 21a and the second light source 21b. The first light source 21a and the second light source 21b may be located on the same side of the display panel 1 and may be symmetrically arranged relative to a perpendicular bisector of the corresponding side of the display panel 1. That is, the first light source 21a and the second light source 21b are facing towards the same side of the display panel 1, and are symmetrically arranged relative to the perpendicular bisector of this side. In this embodiment, the side is defined as the light incident side.

The light-emitting elements of each light source 21 (the first light source 21a or the second light source 21b) include a first light-emitting element R that emits red light, a second light-emitting element G that emits green light, and a third light-emitting element B that emits blue light. FIG. 3 shows an example of the display device and one of ordinary skill in this art should understand that the number of the light emitting units or the arrangement of the light emitting units in embodiments of the present disclosure is not limited to that show in FIG. 3.

In FIG. 5, VSYNC is a vertical synchronization signal. Data represents data signals loaded to the sub-pixels to charge pixel electrodes of the sub-pixels, thereby making the sub-pixels in a color state. LED1 represents a signal to control each light-emitting element in the first light source 21a to be turned on or off, and LED2 represents a signal to control each light-emitting element in the second light source 21b to be turned on or off In the N-th frame, first data signals are loaded onto all the sub-pixels in the first display region. The first data signals refer to pixel signals for displaying a first color. For example, the first data signals are pixel signals for displaying a red color. After loading the data signals for all the sub-pixels in the first display region, the first light emitting unit in the first light source is turned on and, at the same time, all the sub-pixels in the second display region are loaded with the first data signals. In the (N+1)-th frame, second data signals are loaded to all sub-pixels in the first display region, and the first light emitting unit in the second light source is turned on. The second data signals refer to pixel signals for displaying a second color. For example, the second data signals are pixel signals for displaying a green color.

More detailed procedure is described below.

Specifically, as shown in FIG. 5, in the N-th frame, all sub-pixels are loaded with data signals for displaying the red color. When the loading of the data signals proceeds to the position (L/2−s) of the screen, that is, at the time (T/2−t), the third light emitting element B in the second light source 21b is turned off. When loading of the data signals proceeds to the position (L/2+s) of the screen, that is, at the time (T/2+t), the first light emitting element R in the first light source 21a is turned on. The turning on of the first light emitting element R in the first light source 21a lasts for (T/2−t), and then first light emitting element R in the first light source 21a is turned off and at the same time the first light emitting element R in the second light source 21b is turned on. In the embodiment, s may be a preset distance up or down from the perpendicular bisector of the display panel which is perpendicular to the vertical direction.

In the (N+1)-th frame, all sub-pixels are loaded with data signals for displaying the green color. When the loading of the data signals proceeds to the position (L/2−s) of the screen, that is, at the time (T/2−t), the first light emitting element R in the second light source 21b is turned off When the loading of the data signals proceeds to the position (L/2+s) of the screen, that is, at the time (T/2+t), the second light emitting element G in the first light source 21a is turned on. The turning on of the second light emitting element G in the first light source 21a lasts for (T/2−t) and then, the second light emitting element G in the first light source 21a is turned off and, at the same time, the second light emitting element G in the second light source 21b is turned on.

In the (N+2)-th frame, all sub-pixels are loaded with data signals for displaying the blue color. When the loading of the data signals proceeds to the position (L/2−s) of the screen, that is, at the time (T/2−t), the second light emitting element G in the second light source 21b is turned off. When loading of the data signals proceeds to the position (L/2+s) of the screen, that is, at the time (T/2+t), the third light emitting element B in the first light source 21a is turned on. The turning on of the third light emitting element B in the first light source 21a lasts for (T/2−t) and then, the third light emitting element B in the first light source 21a is turned off and, at the same time, the third light emitting element B in the second light source 21b is turned on.

Through the above-described three frames, a colorful display can be achieved. It should be noted that the display panel can display multiple frames and the display principle in other frames are similar to that described above.

In each frame, the loading duration of the data signals is T, which can reduce the data refresh frequency and thereby reduce power consumption. On the other hand, because the charging time of each row of sub-pixels is doubled, a response of the liquid crystal can be more sufficient.

In addition, for example, in the N-th frame, when the loading of the data signals proceeds to the position of (L/2−s) (i.e., at the time (T/2−t)), the third light emitting unit B in the second light source that corresponds to the lower half of the screen is immediately turned off. By doing so, the stray blue light at the middle border of the screen will not illuminate the red display area that has been refreshed (N-th frame) in the upper half of the screen. The screen region from the middle of the screen up to s is not refreshed, and this region is still loaded with the data signal in the (N−1)-th frame for displaying the blue color. When the data refresh is performed to the position of (L/2+s) (i.e., at the time of (T/2+t)), the first light emitting element R in the first light source corresponding to the upper half of the screen is turned on to avoid that the stray red light at the middle border illuminates the display area that has not been refreshed in the lower half of the screen (the area is still loaded with the data signal in the (N−1)-th frame for displaying the blue color). The region from the middle down to the s is refreshed to be loaded with the data signals in the N-th frame for displaying the red color. That is, the interval between the turning-off of the third light emitting element B in the second light source and the turning-on of the first light emitting element R in the first light source in the N-th frame is $2t$, so as to avoid the influence of each light emitting element on the adjacent display region.

In embodiments of the present disclosure, the value of s may be in the range of, for example, 0 to 30 mm, and the value of t may designed depending on the screen size and screen scanning rate, as long as the influence of each light emitting element on the adjacent display region can be avoided.

In the embodiment shown in FIG. 3, the display device may further include a driving circuit 3 and a control circuit 4.

The driving circuit 3 is configured to load data signals to sub-pixels in the display regions. For example, the driving circuit 3 may be a data driver implemented by an integrated circuit (IC). For the data signal loading timing of the driving circuit, the signal Data in FIG. 5 can be referred to.

The control circuit 4 is used to control on and off of each light emitting unit in the two light sources 21a and 21b. For the control timing of the control circuit 4, the signals LED1 and LED2 in FIG. 5 can be referred to. The control circuit 4 may be implemented by an integrated circuit or a controller. For example, the control circuit may be a field color sequence method controller or the like.

The specific working principles of the driving circuit and the control circuit have been described in detail above with reference to FIG. 5, and are not repeated here.

It should be noted that although modules or units of devices for executing functions are described above, such division of modules or units is not mandatory. In fact, features and functions of two or more of the modules or units described above may be embodied in one module or unit in accordance with the embodiments of the present disclosure. Alternatively, the features and functions of one module or unit described above may be further divided into multiple modules or units.

The display device according to the embodiments of the present disclosure may be a transparent display device or a non-transparent display device, which can be used in an electronic device such as a mobile phone, a television, a tablet computer, and an electronic drawing board, and will not be enumerated herein.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustra-tive, and the real scope and spirit of the present disclosure is defined by the appended claims.

What is claimed is:

1. A driving method for a display device, comprising:
providing the display device, wherein: the display device comprises a display panel, a backlight module, and a plurality of display regions; the backlight module comprises x light sources; each of the plurality of display regions corresponds to one of the light sources; and each of the light sources comprises a plurality of light emitting units that emit light of different colors, and x is a positive integer not smaller than two;
after loading data signals to subpixels in one of the display regions, turning on a light emitting unit corresponding to the one of the display regions while loading data signals to subpixels in a next one of the display regions that is adjacent to the one of the display regions;
turning on a light emitting unit corresponding to the next one of the display regions that is adjacent to the one of the display regions after a time period $2t$ after turning off the light emitting unit corresponding to the one of the display regions, a color of light emitted by the light emitting unit corresponding to the one of the display regions and a color of light emitted by the light emitting unit corresponding to the next one of the display regions that is adjacent to the one of the display regions are different, wherein $0<t<T$, and T is a duration of one frame; and
wherein a light emitting duration of respective light emitting units corresponding to each display region is $T/x-t$.

2. The method according to claim 1, wherein:
the plurality of light emitting units that emit light of different colors comprise a first light emitting unit, a second light emitting unit, and a third light emitting unit;
the x light sources comprise a first light source and a second light source;
the plurality of display regions comprise a first display region and a second display region;
the first light source is configured to provide backlight for the first display region; and
the second light source is configured to provide backlight for the second display region.

3. The method according to claim 2, wherein turning on the light emitting unit corresponding to the one of the display regions while loading data signals to subpixels in a next one of the display regions that is adjacent to the one of the display regions after the loading of the data signals to subpixels on the one of the display regions, comprises:
in an N-th frame, loading first data signals to all subpixels in the first display region, wherein N is a positive number;
after loading the first data signals to all subpixels in the first display region, turning on a first light emitting unit in the first light source while loading the first data signals to all subpixels in the second display region; and
in an (N+1)-th frame, loading second data signals to all subpixels in the first display region, and turning on a first light emitting unit in the second light source.

4. The method according to claim 3, wherein the first light emitting unit in the first light source is turned on after a time period $2t$ after loading of the first data signals to the first display region is completed.

5. The method according to claim 4, wherein there is no time interval between turning on time moment of the first light emitting unit in the second light source and turning off time moment of the first light emitting in the first light source.

6. The method according to claim 2, wherein, in each frame, a duration for loading respective data signals to subpixels in the first display region and a duration for loading respective data signals to subpixels in the second display region are both T/2, and T is a duration of one frame.

7. A display device, comprising:

a display panel comprising a plurality of display regions;

a backlight module comprising x light sources, wherein each of the plurality of display regions corresponds to one of the light sources, each of the light sources comprises a plurality of light emitting units that emit light of different colors, and x is a positive integer not smaller than two;

a driving circuit; and a control circuit configured to, after the driving circuit loads data signals to subpixels in one of the display regions, turn on a light emitting unit corresponding to the one of the display regions while controlling the driving circuit to load data signals to subpixels in a next one of the display regions that is adjacent to the one of the display regions, wherein:

the control circuit is further configured to turn on a light emitting unit corresponding to the next one of the display regions that is adjacent to the one of the display regions after a time period $2t$ after turning off the light emitting unit corresponding to the one of the display regions, wherein a color of light emitted by the light emitting unit corresponding to the one of the display regions and a color of light emitted by the light emitting unit corresponding to the next one of the display regions that is adjacent to the one of the display regions are different, wherein 0<t<T, and T is a duration of one frame; and a light emitting duration of respective light emitting units corresponding to each display region is $T/x-t$.

8. The device according to claim 7, wherein:

the plurality of light emitting units that emit light of different colors comprise a first light emitting unit, a second light emitting unit, and a third light emitting unit;

the x light sources comprise a first light source and a second light source;

the plurality of display regions comprise a first display region and a second display region;

the first light source is configured to provide backlight for the first display region; and the second light source is configured to provide backlight for the second display region.

9. The device according to claim 8, wherein:

the driving circuit is configured to, in an N-th frame, load first data signals to all subpixels in the first display region, wherein N is a positive number;

after the driving circuit loads the first data signals to all subpixels in the first display region, the control circuit turns on a first light emitting unit in the first light source while controlling the driving circuit to load the first data signals to all subpixels in the second display region; and in an (N+1)-th frame, the driving circuit loads second data signals to all subpixels in the first display region, and the control circuit turns on a first light emitting unit in the second light source.

10. The device according to claim 9, wherein the control circuit is configured to: turn on the first light emitting unit in the first light source after a time period $2t$ after loading of the first data signals to the first display region is completed.

11. The device according to claim 10, wherein there is no time interval between turning on time moment of the first light emitting unit in the second light source and turning off time moment of the first light emitting in the first light source.

12. The device according to claim 8, wherein, in each frame, a duration for loading respective data signals to subpixels in the first display region and a duration for loading respective data signals to subpixels in the second display region are both T/2, and T is a duration of one frame.

* * * * *